Jan. 31, 1933.  J. KOLSTERS  1,895,669
DIRECTION SIGNAL
Filed April 13, 1927
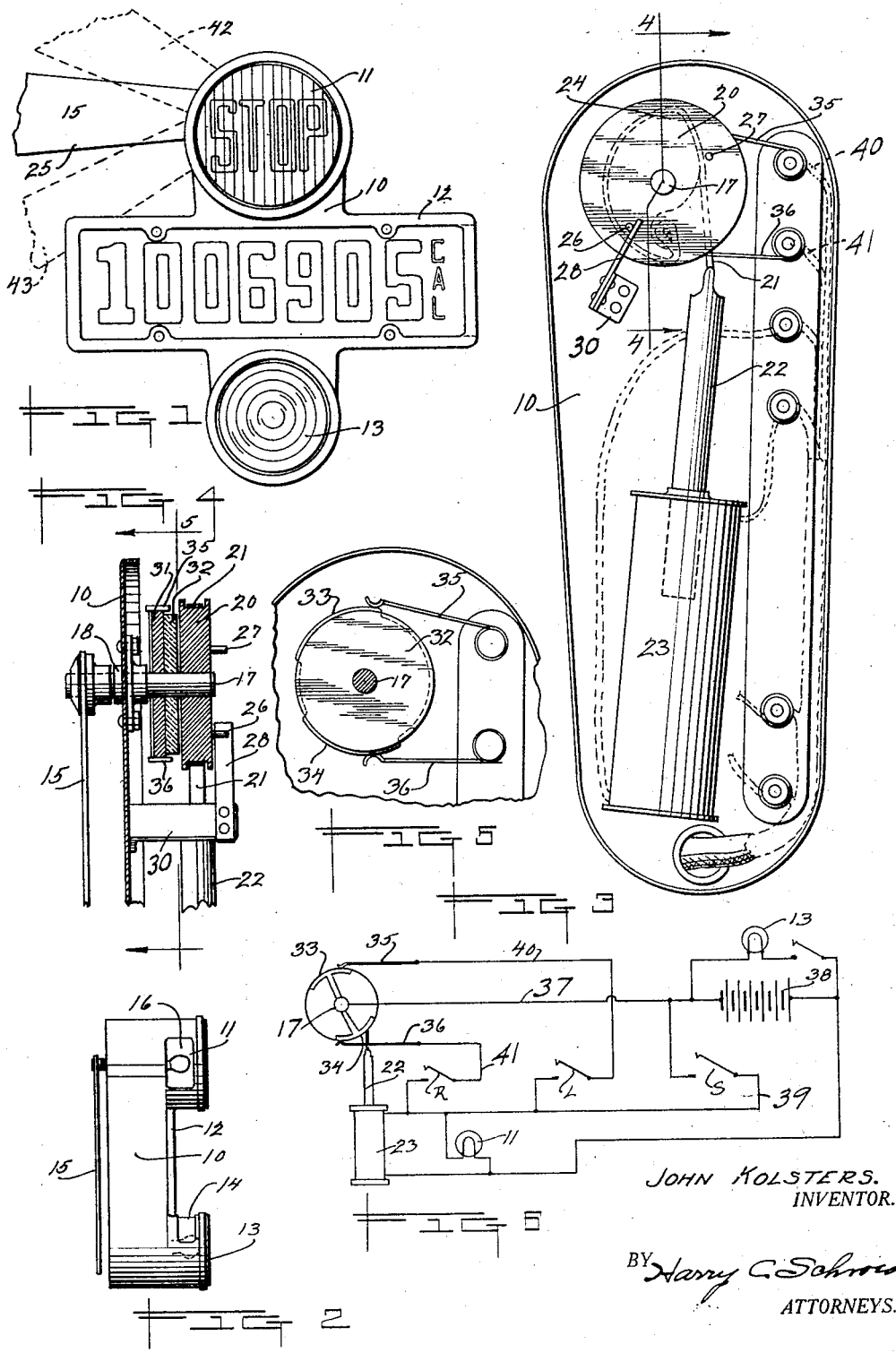
JOHN KOLSTERS.
INVENTOR.
BY Harry C Schroder
ATTORNEYS.

Patented Jan. 31, 1933

1,895,669

UNITED STATES PATENT OFFICE

JOHN KOLSTERS, OF OAKLAND, CALIFORNIA

DIRECTION SIGNAL

Application filed April 13, 1927. Serial No. 183,328.

This invention relates to electrical direction signals for automobiles, and has for an object to provide an improved signal for apprising other motorists of what the driver of the car intends to do. Another object is to provide a signal of higher visibility than those in common use. A further object is to provide a signal comprising a moving, intermittently illuminated member which will readily attract the attention of other drivers. A further object is to combine in one neat, compact unit, a stop light, direction signal, illuminated license plate and tail light.

Further objects will appear from the following description, taken in connection with the accompanying drawing, in which:

Fig. 1 is a rear elevation of a device embodying the invention,

Fig. 2 is a side view of the same,

Fig. 3 is an enlarged rear elevation with parts removed to show the interior mechanism, Fig. 4 is a section on the line 4—4 of Fig. 3, Fig. 5 is a section on the line 5—5 of Fig. 4 and, Fig. 6 is a wiring diagram.

As seen in Figs. 1 and 2, the device comprises a casing 10 and a stop light 11 at its top, a license plate holder 12 therebelow, and the usual tail light 13, the casing above the tail light being provided at 14 with a clear glass insert to permit the light to illuminate the license plate.

A semaphore 15, formed of some light but rigid material, extends to the left of the stop light 11. The casing 10 is provided with an aperture 16, to permit the stop light, when burning, to illuminate the semaphore so as to heighten its visibility. The semaphore is fixed to a shaft 17 journaled at 18 in the casing 10. Fixed to shaft 17 is a cam 20, to which is attached a flexible band 21, the band being wound on the cam in the manner shown in Fig. 3. The other end of band 21 is connected to the core 22 of an electromagnet 23, so that energization of the electromagnet will cause the cam to rotate, thus rotating the semaphore 15. Cam 20 is so shaped at 24 that the core 22 will have its greatest leverage when the semaphore is in its horizontal position 25, and may also be shaped or weighted to form a counterbalance for the semaphore. The movement of the semaphore is limited by stops 26 and 27 which engage a flat spring 28 fixedly connected to the casing by a bracket 30. The effect of the spring 28 is not only to arrest the movement of the semaphore but also to give it an impetus in the opposite direction, so that by means to be described, the semaphore may be oscillated to further heighten its visibility. Fixed to shaft 17 are two disks 31 and 32, disk 31 being of conducting material and electrically connected to the shaft, disk 32 being of insulating material. Disk 31 is of slightly greater diameter than disk 32, but is cut away in such a manner as to leave segments 33 and 34 extending beyond the periphery of disk 32.

A pair of spring contacts 35, 36 are arranged to contact with the peripheries of disks 31 and 32. The shaft 17 is connected through casing 10 and lead 37, with one terminal of the storage battery 38. Contacts 35 and 36 are connected, by leads 40 and 41, to the opposite terminal of said battery, so that when the shaft is rotated into position to bring one of the segments 33, 34 into contact with one of the spring contacts, a circuit is made through electromagnet 23.

Referring to Fig. 6 it will be seen that electromagnet 23 and stop light 11 are connected in parallel, so that whenever the electromagnet is energized, the light 11 will burn. A third circuit 39 is provided parallel to circuits 40 and 41. Circuits 41, 40 and 39 are controlled by switches designated as R, L, S, indicating respectively, right, left, and stop. Switches R and L are preferably mounted upon or near the steering wheel of the car, while the switch S is controlled by the brake pedal in known manner.

When the switch S is closed, to indicate that the driver intends to stop, electromagnet 23 and stop light 11 are energized, and the semaphore is drawn to its uppermost position, indicated at 42 in Fig. 1, and held there as long as the switch remains closed, light 11 also burning continuously and illuminating the semaphore through aperture 16.

In this position, spring 28 bears against stop 27 which prevents the semaphore from rotating further.

When the switch R is closed to indicate a right turn, the electromagnet 23 and light 11 are likewise energized, and the semaphore is drawn up to its extreme position 42. Upon reaching that position, however, contact 36 passes out of engagement with sector 34 and rests upon insulating disk 32. This breaks the circuit, and the semaphore drops back to its lowermost signaling position, indicated at 43. This again closes the circuit and the semaphore is again raised, the result being that the semaphore is oscillated from its lowermost position to its uppermost position as long as switch R remains closed, the spring 28 assisting in reversing the movement of the semaphore. During this operation light 11 alternately flashes on and off with the result that the attention of the driver of a following car is very effectively called to the signal.

When switch L is closed, a similar action takes place, except that, due to the position of segment 33, the semaphore only reaches position 25 when the circuit is broken and the semaphore returns to position 43 and is thereafter oscillated between positions 43 and 25 instead of between positions 43 and 42.

From the foregoing description it will be apparent that advantage is taken of the fact that a moving object attracts attention more readily than a stationary object, and this effect is heightened by the effect of a light which alternately flashes on and off to intermittently illuminate the semaphore.

I claim:

1. In combination with a signal casing, a conductive shaft rotatably mounted in said casing and in electrical circuit therewith, a signal arm secured on one end of said shaft, a disk of insulating material secured to said shaft, conductive shoes formed over the periphery of said disc and electrically connected to said shaft, said shoes being of substantially equal arcuate length, the gap between said shoes being greater on one side than on the other, diametrically disposed brushes adapted to cooperate with one or both shoes or with said insulating disk when said disk is moved to various positions, a solenoid having the core thereof connected to rotate said disc, a switch controlled circuit from each of said brushes to one terminal of said solenoid, the other terminal of said solenoid being connected to one terminal of a battery, the other terminal of said battery being connected to said casing, said spring fingers and shoes being so related as to selectively control the signal arm in two signalling positions to cause oscillation thereof in the selective position.

2. A signal device comprising a conductive housing, a conductive shaft mounted in said housing, a signal arm on said shaft, a disc of insulating material secured on said shaft, two diametrically disposed conductive shoes formed about the periphery of said disc and electrically connected to said shaft, a spring finger for cooperation with each shoe and with the intervening portions of said disc, and insulated from said housing, a switch controlled circuit for each finger, electro-magnetic means for operating said disc, said shoes and cooperating fingers being so related whereby the signal arm is selectively oscillated in two operative positions by control of the electro-magnetic means by the respective spring finger.

In testimony whereof I affix my signature.

JOHN KOLSTERS.